United States Patent [19]

Aronsson

[11] Patent Number: 5,488,215
[45] Date of Patent: Jan. 30, 1996

[54] SWIVEL CONNECTION

[75] Inventor: Joachim Aronsson, Hönö, Sweden

[73] Assignee: Rotech Tooling, Sweden

[21] Appl. No.: 211,958

[22] PCT Filed: Oct. 20, 1992

[86] PCT No.: PCT/SE92/00730

§ 371 Date: Apr. 21, 1994

§ 102(e) Date: Apr. 21, 1994

[87] PCT Pub. No.: WO93/07986

PCT Pub. Date: Apr. 29, 1993

[30] Foreign Application Priority Data

Oct. 21, 1991 [SE] Sweden .................................. 9103051

[51] Int. Cl.[6] .................................................. B23K 11/36
[52] U.S. Cl. ...................... 219/86.25; 219/86.7; 439/27; 901/42
[58] Field of Search ............................ 219/86.25, 84, 219/86.7; 439/22, 27; 901/42

[56] References Cited

U.S. PATENT DOCUMENTS

| 4,348,575 | 9/1982 | Hedren et al. ........................... 901/42 |
| 4,438,309 | 3/1984 | Zimmer . |
| 4,500,769 | 2/1985 | Tincher .................................. 219/86.25 |
| 4,507,534 | 3/1985 | Kaufmann et al. . |
| 4,763,401 | 8/1988 | Marinoni et al. ......................... 901/42 |
| 4,916,271 | 4/1990 | Lee et al. ................................. 219/84 |
| 5,173,053 | 12/1992 | Swanson et al. ........................ 439/27 |

FOREIGN PATENT DOCUMENTS 0424230  4/1991  European Pat. Off. .

Primary Examiner—Clifford C. Shaw
Attorney, Agent, or Firm—Lerner, David, Littenberg, Krumholz & Mentlik

[57] ABSTRACT

A swivel connection for attachment to robot arms is disclosed for supplying a fluid to an associated tool mounted on the robot arm. The swivel connection includes a rotatable cylindrical hub, an attachment device mounted on one surface of the hub for rotation therewith, a non-rotatable coupler surrounding the cylindrical hub, first and second concentric contacts juxtaposed with the coupler and electrically isolated from each other and from the coupler, a cover on a second surface of the hub and rotatable therewith, first and second concentric rings surrounding the cover, the first concentric ring juxtaposed with the first concentric contact and the second concentric ring juxtaposed with the second concentric contact, the first and second concentric rings being electrically isolated from each other and from the cover, and the coupler, the hub, the cover, and the first and second concentric rings each including channels extending respectively therethrough so that a fluid can be supplied from a first end of a channel in the coupler to a second end of the channel in the ring during rotation of the swivel connection.

12 Claims, 9 Drawing Sheets

SWIVEL CONNECTION

FIELD OF THE INVENTION

The present invention relates to swivel connections. More particularly, the present invention relates to swivel connections intended to be included in a robot arm. Still more particularly, the present invention relates to such swivel connections for use in connection with robot arms for electric welding, or other tools for the application of electric currents or fields, or for valves, gripping means, and other such tools. Still more particularly, the present invention relates to such swivel connections which can also transfer liquid or gaseous media for use therein. The present invention thus relates to the last link of a robot arm on which a spot welding jaw or other such tools are to be mounted.

BACKGROUND OF THE INVENTION

Industrial robots for use in connection with various welding processes, such as spot welding, are now quite well known and have been in use for several decades. They are especially useful in production lines, such as for the production of cars, and then primarily for welding together car body parts or the like. In such applications, the robots must have a minimum size and rigidity so that they can apply the weld spot to the appropriate location, but at the same time they must be sufficiently flexible so that they can reach difficult locations. The spot weld itself is obtained by means of a current pulse of alternating or direct current having a high amperage, usually on the order of about 5,000 to 30,000 amperes. Therefore, it is necessary that thick cables be drawn to the welding jaw from a transformer, which is usually arranged in the vicinity of the base of the robot arm. However, these thick current cables, which hang outside the robot arm in some manner, presents a large hindrance to the movements of the robot arm. The robot arm must be able to swing in different directions, and even turn around an axis, so that the cable must therefore be relatively long, so that it can follow all of these movements of the arm. Besides the supply of current through such a thick current cable, it is also necessary to supply cooling water and pressure air for the various operations of the welding jaw. This, in turn, requires additional pipes and/or flexible hoses.

Similar such problems arise even in the cases where weaker currents need to be supplied to means other than a welding jaw. For example, these can be electrically controlled valves, gripping means or other such tools and the like.

Other such arrangements than these mentioned above, which do not require an electrical current, but which only need to be cooled or supplied with a liquid or gaseous medium, also are faced with the problems mentioned above, for example, those relating to space for flexible hoses and the like, which limits the movability of a robot arm.

Although the above-mentioned robots have been highly developed, and have functioned well for many years, they nevertheless have the serious limitation that, due to the thick cables and hoses required, the robot arm cannot reach all of the necessary locations. This renders production more difficult, and the construction of the articles which are to be welded, such as auto bodies, must therefore be adapted to the limitations of the robot. Since the initial use of such robots for spot welding and the like, it has been desired that one should be able to render the robot arm, with an additional welding jaw or the like, more flexible, so that all of the potential welding points or the like can be reached.

SUMMARY OF THE INVENTION

In accordance with the present invention, these and other problems have now been solved by the invention of a swivel connection for attachment to a robot arm for the supply of a fluid therethrough to associated tool means comprising a rotatable cylindrical hub having a first transverse surface, a second transverse surface, and an outer cylindrical surface, and attachment means on the first transverse surface for attachment to the robot arm, a non-rotatable coupling member having an inner surface surrounding the outer cylindrical surface of the cylindrical hub, first and second concentric contact members juxtaposed with the coupling member and electrically isolated from each other and from the coupling member, a cover member on the second transverse surface of the cylindrical hub and rotatable therewith, first and second concentric ring members surrounding the cover member, the first concentric ring member juxtaposed with the first concentric contact member, and the second concentric ring member juxtaposed with the second concentric contact member, the first and second concentric ring members being electrically isolated from each other and from the cover member, the coupling member including coupling member channel means extending therethrough including a first externally accessible end and a second end on the inner surface of the coupling member proximate to the outer cylindrical surface of the cylindrical hub, the cylindrical hub including hub channel means extending therethrough including a first end proximate to the second end of the coupling member channel means and a second end proximate to the cover member, the cover member including cover member channel means extending therethrough including a first end proximate to the second end of the hub channel means and a second end proximate to the first and second concentric ring members, the first and second concentric ring members including ring member channel means extending therethrough, including a first end proximate to the second end of the cover member channel means and a second end for attachment to the tool means associated with the robot, whereby the fluid can be supplied from the first end of the coupling member channel means to the second end of the ring member channel means during rotation of the swivel connection. In a preferred embodiment, the fluid is a gas or a liquid.

In accordance with another embodiment of the swivel connection of the present invention, each of the channel means comprises a plurality of channel members whereby a plurality of fluids may be supplied from the first ends of the plurality of coupling member channel means to the second ends of the plurality of ring member channel means during rotation of the swivel connection. In a preferred embodiment, the second ends of the plurality of coupling member channel means are axially displaced along the inner surface of the coupling member juxtaposed with the outer surface of the cylindrical hub, the outer surface of the cylindrical hub including a plurality of hub grooves at locations corresponding to the second ends of the plurality of coupling member channel means on the inner surface of the coupling member, each of the plurality of hub grooves communicating with the first end of the plurality of cylindrical hub channel members. Preferably, the swivel connection includes a plurality of O-ring grooves alternating with the plurality of hub grooves on the outer surface of the cylindrical hub, and including a plurality of O-rings disposed in the plurality of O-ring grooves.

In accordance with another embodiment of the swivel connection of the present invention, the swivel connection includes insulation means electrically separating the first and second concentric contact members from each other and from the coupling member. Preferably, the electrical insulation means comprises elastic O-ring members.

In accordance with another embodiment of the swivel connection of the present invention, the coupling member includes pressure channel means interposed between the coupling member channel means and a surface of the coupling member juxtaposed with the first and second concentric contact members whereby pressure can be supplied through the pressure channel means to urge the first and second concentric contact members against the corresponding first and second concentric ring members.

In accordance with another embodiment of the swivel connection of the present invention, the attachment means includes a plurality of longitudinally-extending through bolt holes for affixing the attachment means to the cylindrical hub, and a corresponding plurality of fastening bolts extending through the through bolt holes. In a preferred embodiment, the attachment means includes threaded radial openings associated with the plurality of through bolt holes for applying locking screws to the fastening bolts contained in the through bolt holes. Preferably, the plurality of fastening bolts each includes a surrounding recess at a location corresponding to the location of the threaded radial openings, and most preferably in which the surrounding recess includes sloping side walls having an angle of about 45° with respect to the fastening bolts.

In accordance with the present invention, it has been made possible to achieve these results and to provide a swivel connection which is intended to constitute a part of a robot arm for electrical welding, for electrical control of valves, gripping means, etc., and/or for transferring liquid or gaseous media. This is now accomplished by applicants invention of a rotatable cylindrical hub having an attachment piece at one end for attaching the swivel connection to a robot arm or the like, a non-rotatable coupling sleeve surrounding the hub, a pair of concentric contact rings electrically isolated from each other and from the coupling sleeve surrounding a narrower part thereof, and a cover attached to the second end of the hub, around which cover two concentric rings are arranged adjacent to the two concentric rings around the coupling sleeve, and electrically isolated from each other and from the cover itself. Channels for the supply of air and/or liquid are arranged in the coupling sleeve, the hub and the cover with its associated concentric rings.

According to the present invention, the channels through the coupling sleeve end at different axial levels on the cylindrical inner side of the sleeve, and communicate with circumferentially running grooves on the cylindrical outer side of the hub, which grooves in their turn are separately connected to axial channels in the hub, which channels, in turn, communicate with radial channels in the cover and the concentric rings surrounding same.

According to the present invention seals, in the form of O-rings or the like, are arranged in grooves between the circumferentially running grooves on the outer surface of the hub.

In accordance herewith, it is also suitable for the two concentric rings around the coupling sleeve to be maintained at some distance from the coupling sleeve and from each other by means of elastic O-rings or the like.

It is also suitable that channels be arranged in the coupling sleeve for the supply of a pressure medium to the space between the coupling sleeve and the concentric rings arranged around the coupling sleeve for pressing these rings against corresponding rings around the cover.

According to the present invention, it is desirable that the attaching piece at one end of the hub consist of a ring having through bolt holes.

It is also advantageous that these bolt holes be connected to threaded radial openings for screwing in locking screws against removable fastening bolts therein.

The bolts in the bolt holes should preferably have a surrounding recess at the location where the locking screws are intended to abut, and this recess should consist of a groove having sloping sides, the slope of which is about 45° with respect to the axis of the bolt.

BRIEF DESCRIPTION OF THE DRAWINGS

The following detailed description of the present invention can be more readily appreciated when considered in light of the drawings showing a swivel connection of the present invention adopted to serve and carry a welding jaw as follows.

DETAILED DESCRIPTION

Figure 1:
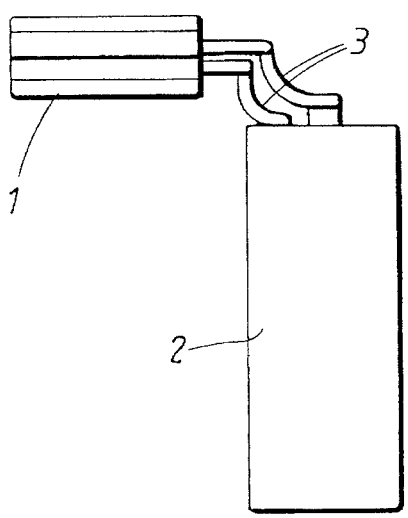
FIG. 1 is a side elevational schematic view of a swivel connection according to the present invention mounted with respect to a transformer.

Referring to the figures, in which like numerals refer to like portions thereof, FIG. 1 shows a swivel connection 1 according to the present invention connected to a transformer 2 by means of a blade conductor 3.

Figure 2:
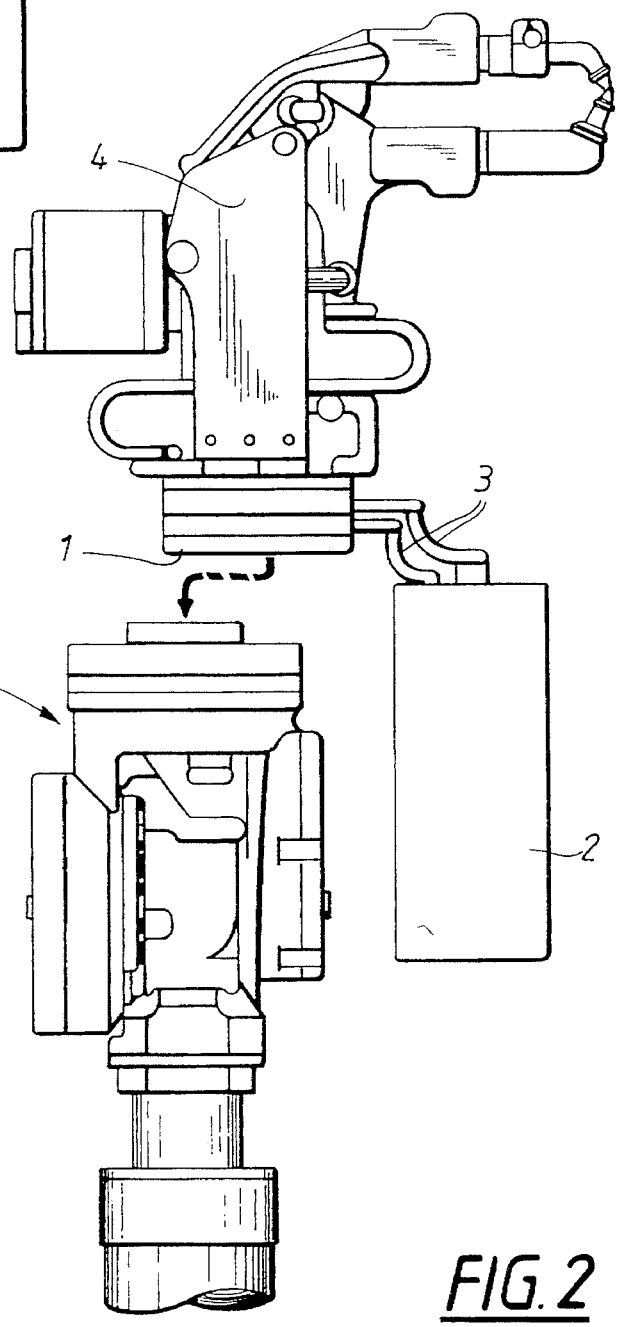
FIG. 2 is a side elevational partially schematic view of a swivel connection in accordance with the present invention connected to a transformer with a welding jaw demonstrating its attachment to the end of a robot arm.

Referring next to FIG. 2, the arrangement according to FIG. 1 is shown along with attached welding jaw 4. In this figure, an outer end 5 of a robot arm is also shown on which the swivel arrangement 1 according to the present invention is intended to be attached. The robot arm 5 and the welding jaw 4 are conventional in this art, and are therefore not described in further detail. The current supply to the transformer 2, which is carried out by means of high voltage conductors, are also not shown, as their arrangement is simple, and does not pose any problems.

Figure 3:
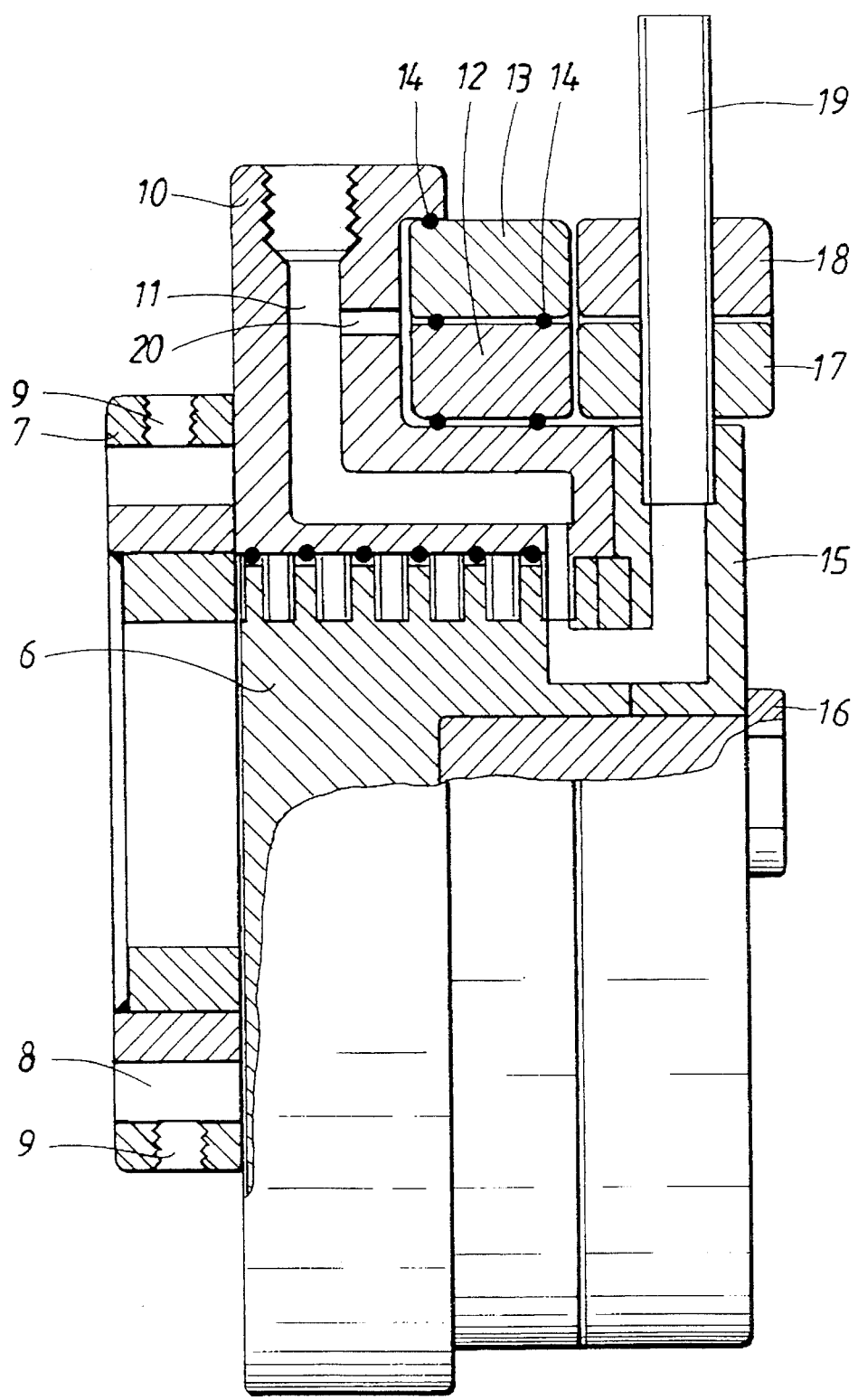
FIG. 3 is a side elevational, partially sectional view of a swivel connection in accordance with the present invention.

Referring next to FIG. 3, the hub 6 is shown partly in section, and firmly connected, such as by welding, to a fastening ring 7. In this fastening ring 7 a number of holes, preferably 6, have been bored, for fastening bolts which are described below. Radial holes 9 for locking screws are bored in the fastening ring 7 in proximity to the bolt holes 8. Around the hub 6 is mounted a coupling sleeve 10, with channels 11 for the supply of air or a liquid to grooves in the hub 6. Around the coupling sleeve 10, on a narrow portion thereof are arranged two concentric rings 12 and 13. These rings are isolated from each other and from the coupling sleeve 10, for example, by means of O-rings 14.

Turning to FIG. 3, there is shown a cover 15 which, by means of a screw 16, is screwed to the hub 6. On the radial side of the cover are arranged two concentric rings 17, 18. These rings are mounted by means of pipes 19. Rings 17 and 18 are electrically isolated from each other and from the cover 15. As appears from the figure, the channel 11 continues from the coupling sleeve, through the hub 6, into the cover 15 and finally out through the pipes 19. This channel 11, six of which are suitably present, is intended to partly conduct the movements of the welding jaw by means of air pressure, and partly to cool same by means of cooling water.

As stated above, rings 12 and 13, as well as rings 17 and 18, are each electrically isolated from each other. These rings are intended for the supply of current. They can thus consist of copper, and can be covered with some isolating or insulating material, but not on that side of same which faces the corresponding ring of the same size. When current is thus supplied to the welding jaw, it is conducted into and out of the lines through the rings 12 and 13, which are provided with coupling lugs. The current is conducted further to the welding jaw through the rings 17 and 18, which are also provided with coupling lugs. To create an electrical connection between the rings 12, 13 and 17, 18 the rings 12 and 13 are pressed against the rings 17, 18 by means of pressure air, which can be guided in, for example, through two diametrically opposite channels 20. The rings 12 and 13 are resiliently suspended by means of the O-rings and they thus return to the isolating position when the air pressure in the channel 20 ceases. In this manner, the supply of current is broken at the same time that the air pressure which operates the welding jaw disappears. Since it is the air pressure in the welding cylinder of the jaw which moves the welding electrodes against the welding spot, and thus starts to weld, then in that case no current transport will arise until the air has been switched on and the rings have been pressed against each other. This prevents damage from burning which occurs on the contact surfaces of the current device.

Those parts of the swivel connection according to the present invention which are coupled to the robot arm, namely the hub having the fastening ring 7 and the cover 15, as well as the rings 17 and 18, will be able to turn together with the robot arm, whereas the coupling sleeve 10 having the contact rings 12 and 13 will be stationary with regard to turning movements.

Those parts of the swivel connection according to the present invention which are coupled to the robot arm, namely the hub having the fastening ring 7 and the cover 15, as well as the rings 17 and 18, will be able to turn together with the robot arm, whereas the coupling sleeve 10 having the contact rings 12 and 13 will be stationary with regard to turning movements.

Figure 4:
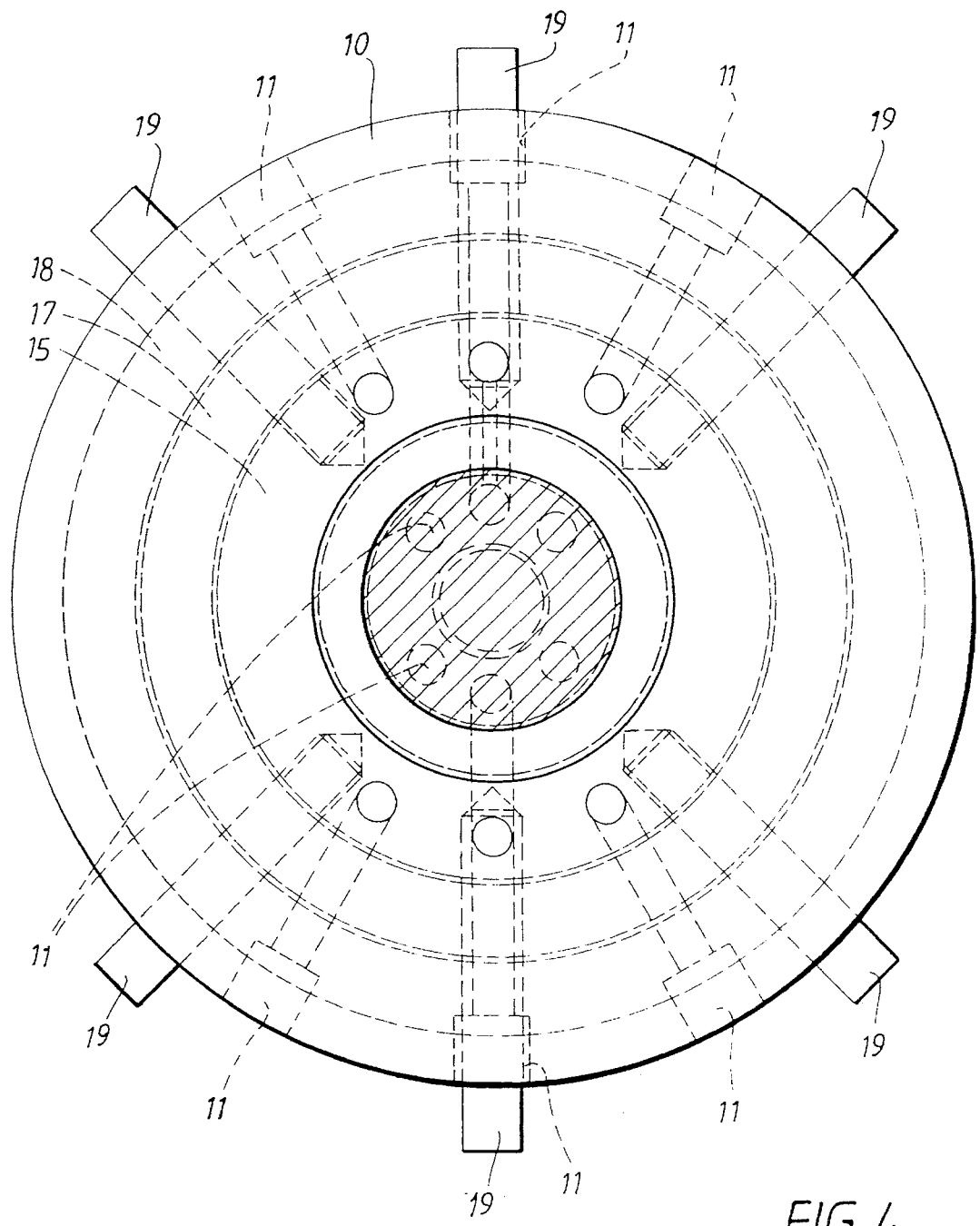
FIG. 4 is a top elevational view of the swivel connection of the present invention shown in FIG. 3.

FIG. 4 shows the swivel arrangement as seen from above i.e., against the cover. In this drawing, it appears that there are six channels 11 and six fastening pipes 19. The outer end of the coupling sleeve 10, and the rings 17 and 18, which are mounted on the cover 15, is shown on this figure. The channels 11 which come up centrally in the hub are shown thereon.

Figure 5:
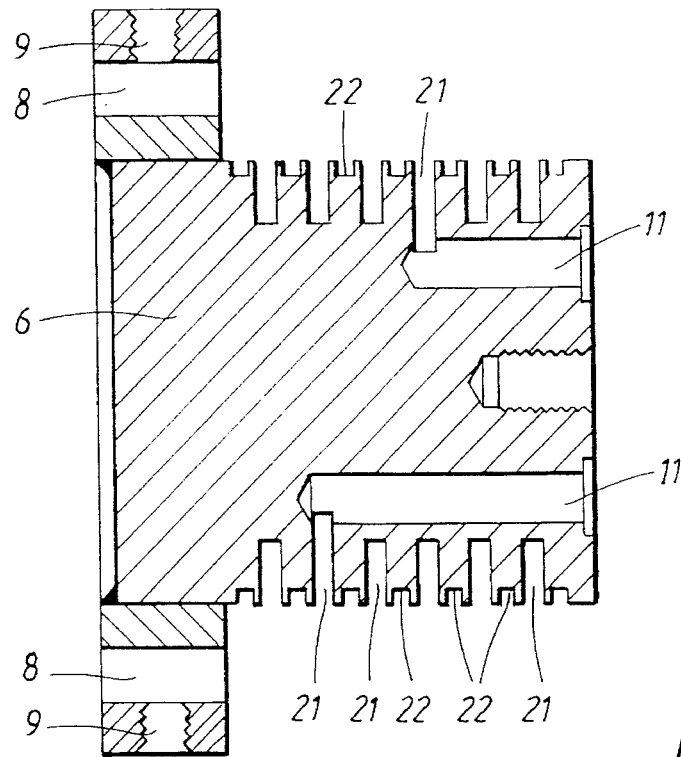
FIG. 5 is a side sectional view of the hub and attachment means in the swivel connection of the present invention.

FIG. 5 shows a section taken through the hub 6. As shown therein, this hub has been provided with grooves 21 on its cylindrical outer side. These grooves are connected to a separate channel 11 in the coupling sleeve 10, and end in a separate axial channel which makes a continuation of the channel 11 in the coupling sleeve 10. As can be seen in the figure, six grooves are arranged therein, each corresponding to a separate channel 11. Between the grooves 21 smaller grooves 22 have been arranged. These grooves are intended to house O-rings or other seals which will turnably abut against the cylindrical inner side of the coupling sleeve 10, and thus separate each groove 21 and channel 11 from each other.

Figure 6:
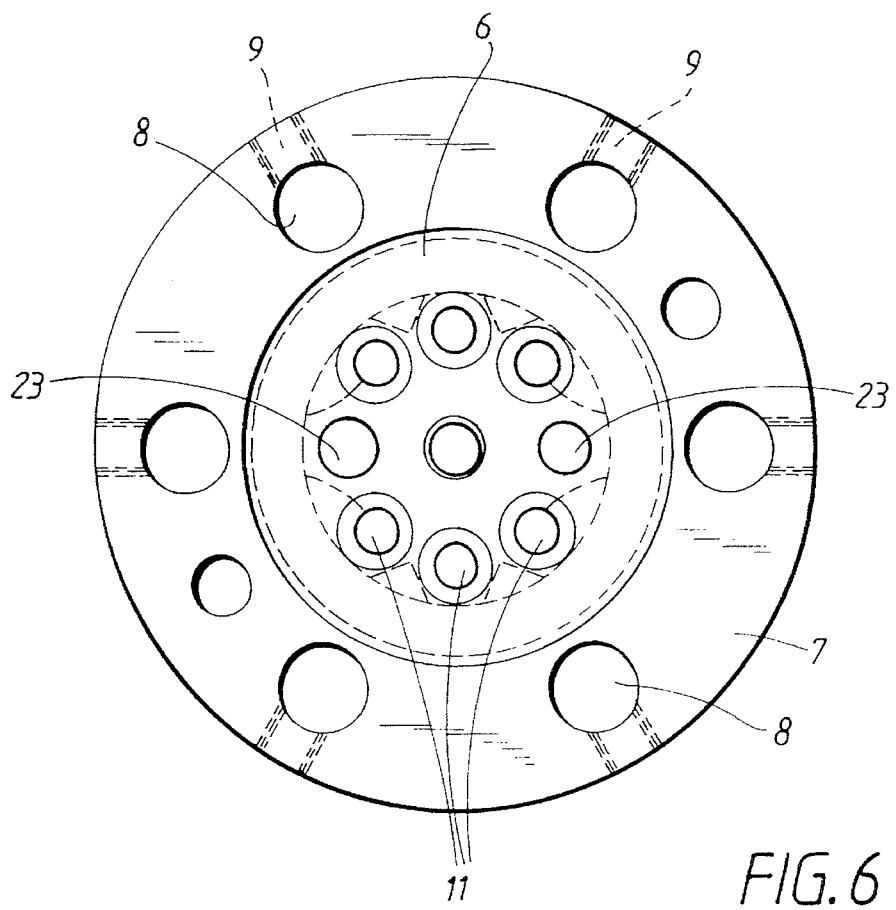
FIG. 6 is a top elevational view of the hub shown in FIG. 5.

FIG. 6 shows the hub 6 as seen from above. The channels 11, which in this case are six in number, end upwardly close to the center of the hub. In their true center a hole is made for screwing in the nut 16, which retains the cover in position. The further two bores 23 in the hub are intended for guiding pins.

Figure 7:
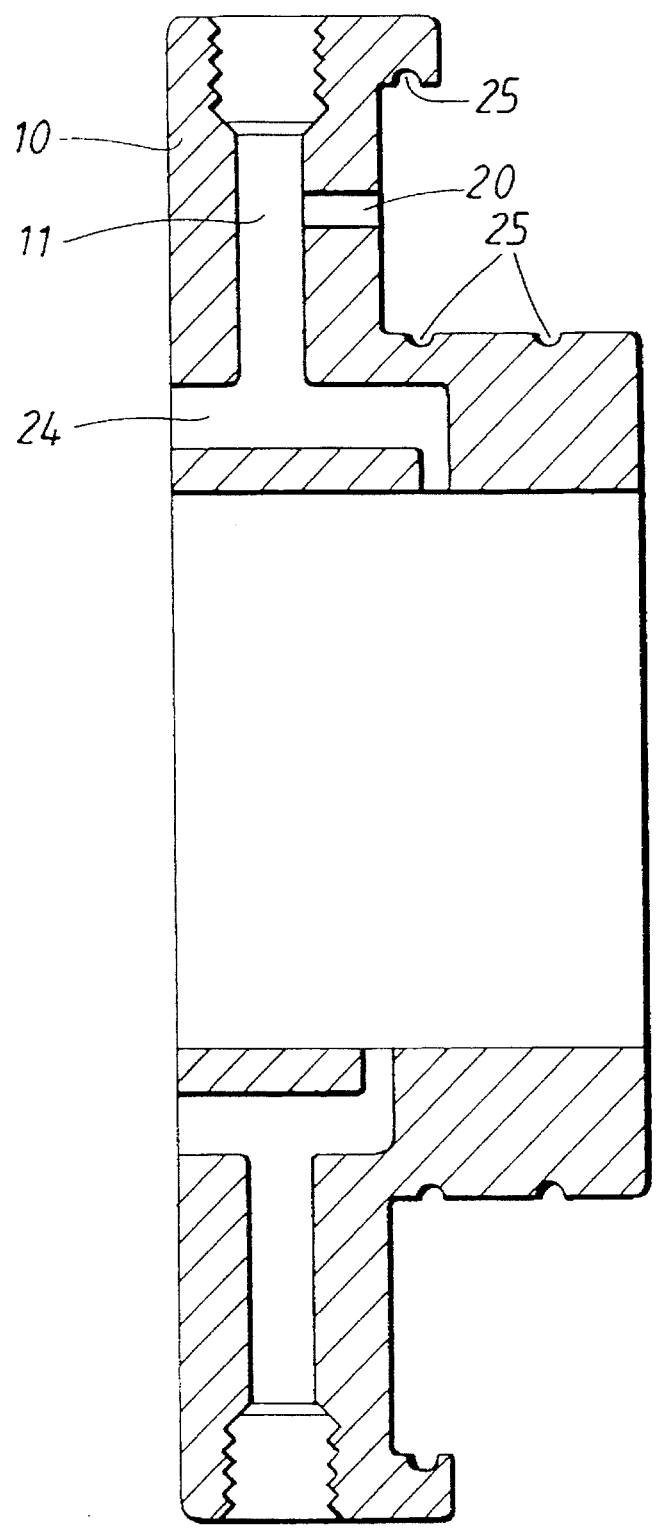
FIG. 7 is a side elevational sectional view of a coupling sleeve used in the swivel connection of the present invention.

FIG. 7 shows a second through the coupling sleeve 10. In this case, channels 11 are provided, which end at different levels of the cylindrical inner surface. As can be seen from the figure, channels 11 include an opening 24 to one side, but this opening 24 is plugged after production. This opening is made for technical production reasons, as the axial part of the channel 11 is bored from one side. Grooves 25 for the O-rings, which are intended to retain the contact rings 12 and 13, are made at appropriate locations.

Figure 8:
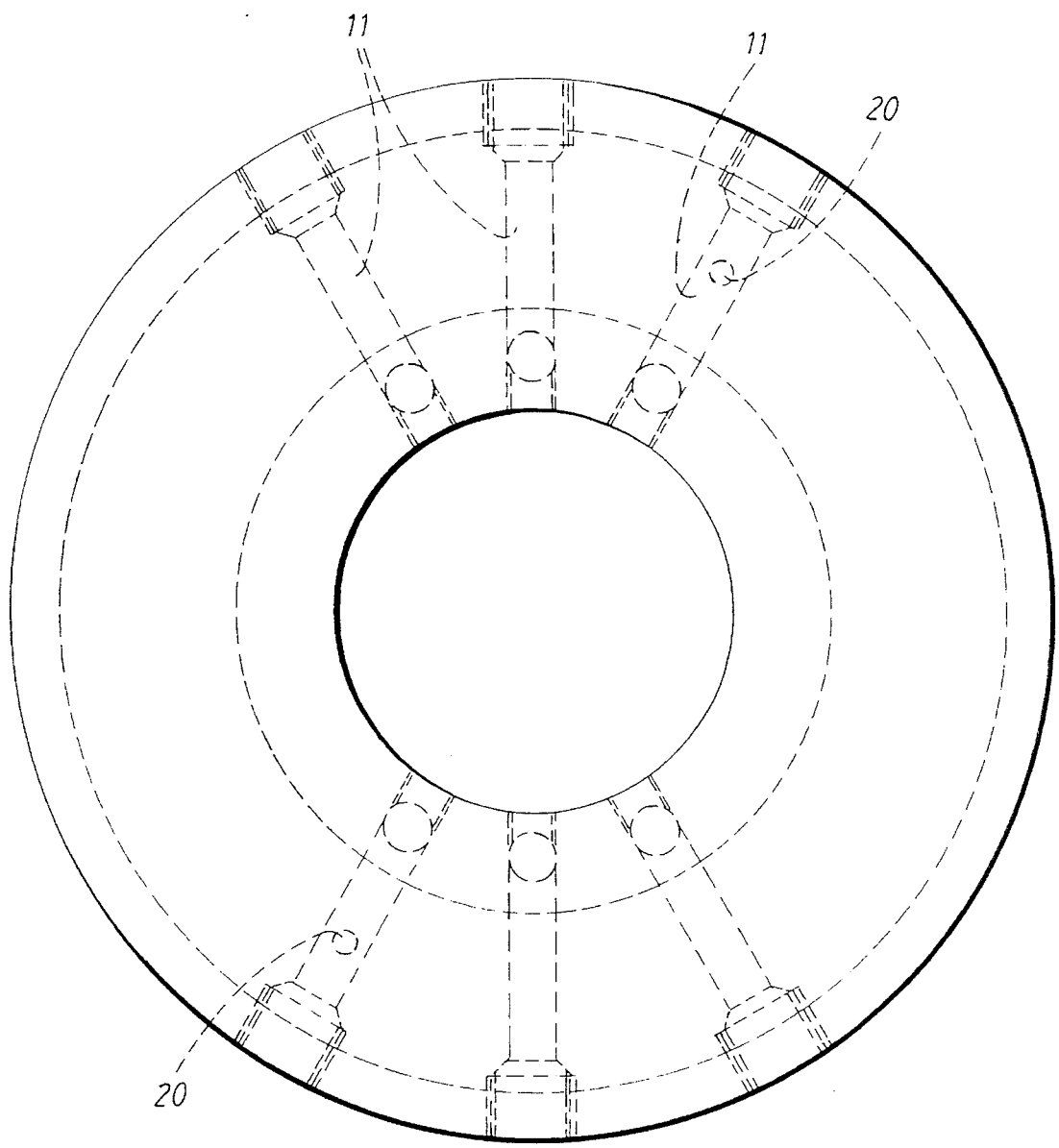
FIG. 8 is a top elevational view of the coupling sleeve shown in FIG. 7.

FIG. 8 shows the coupling sleeve 10 as seen from above, with the channels 11 and two diametrically opposed bores 20, for pressing rings 12 and 13 against rings 17 and 18.

Figure 9:
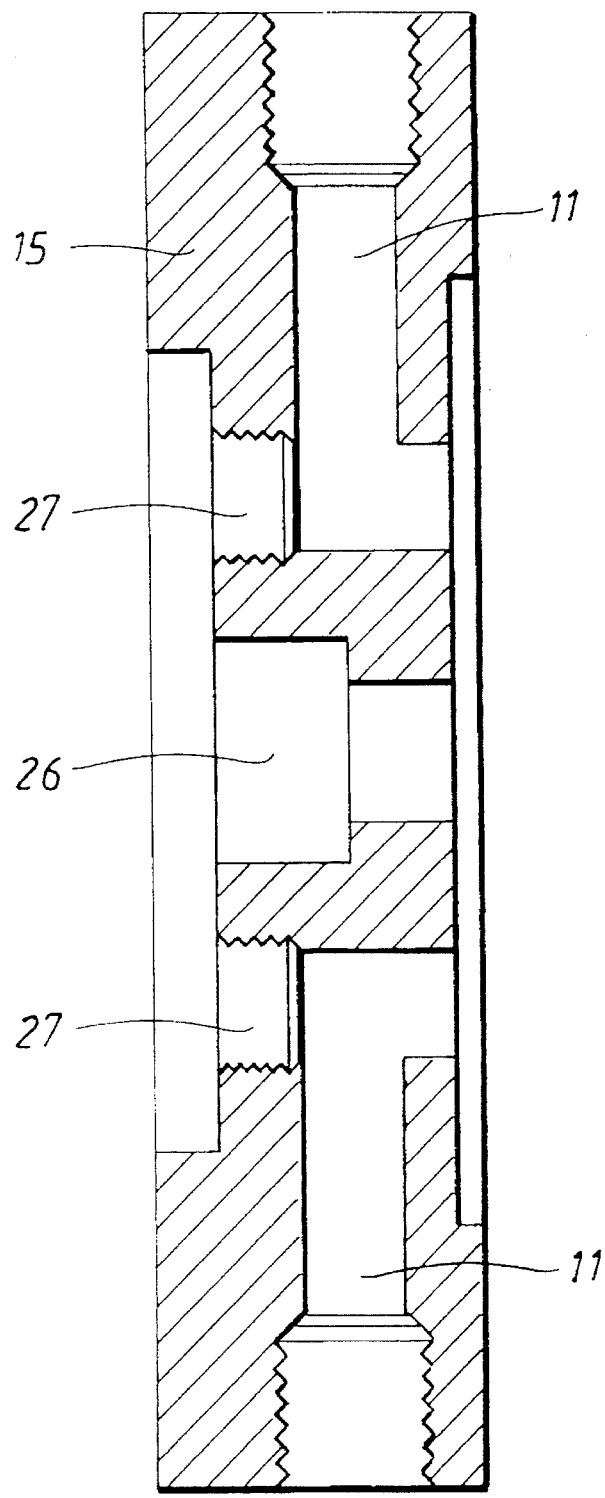
FIG. 9 is a side elevational sectional view of a cover used in the swivel connection of the present invention.

FIG. 9 shows a section through the cover 15. In this figure, two channels 11 and a central bore 26 for the screw 16 are shown. The screw 16 is intended to connect the cover 15 to the hub 6. The openings 27 which go to the channels 11 are normally plugged. If one so desires, these openings can be used for suitable purposes.

Figure 10:
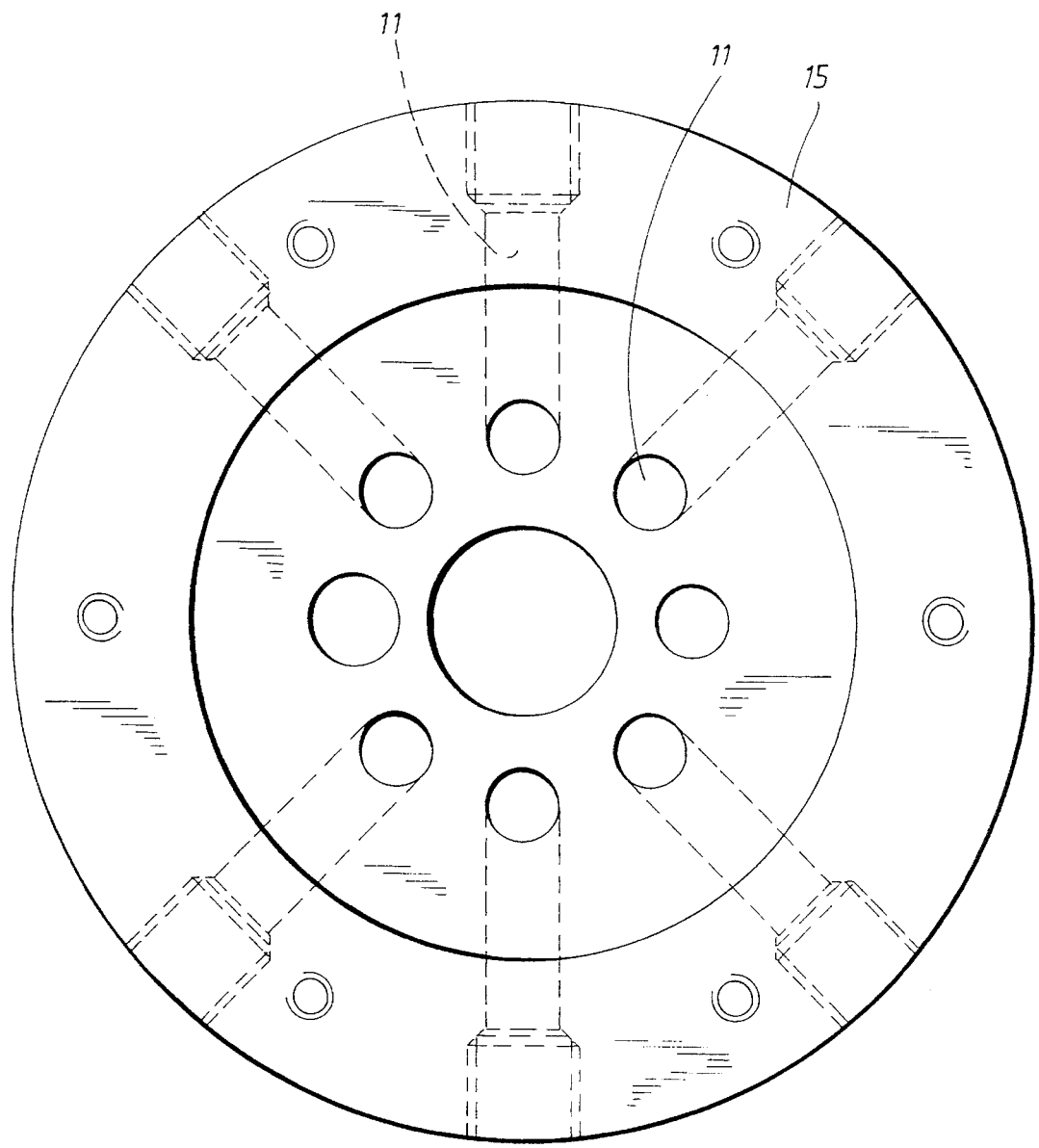
FIG. 10 is a top elevational view of the cover shown in FIG. 9.

FIG. 10 shows the cover 15 as seen from above, with the channels 11 and the bore 26.

Figure 11:
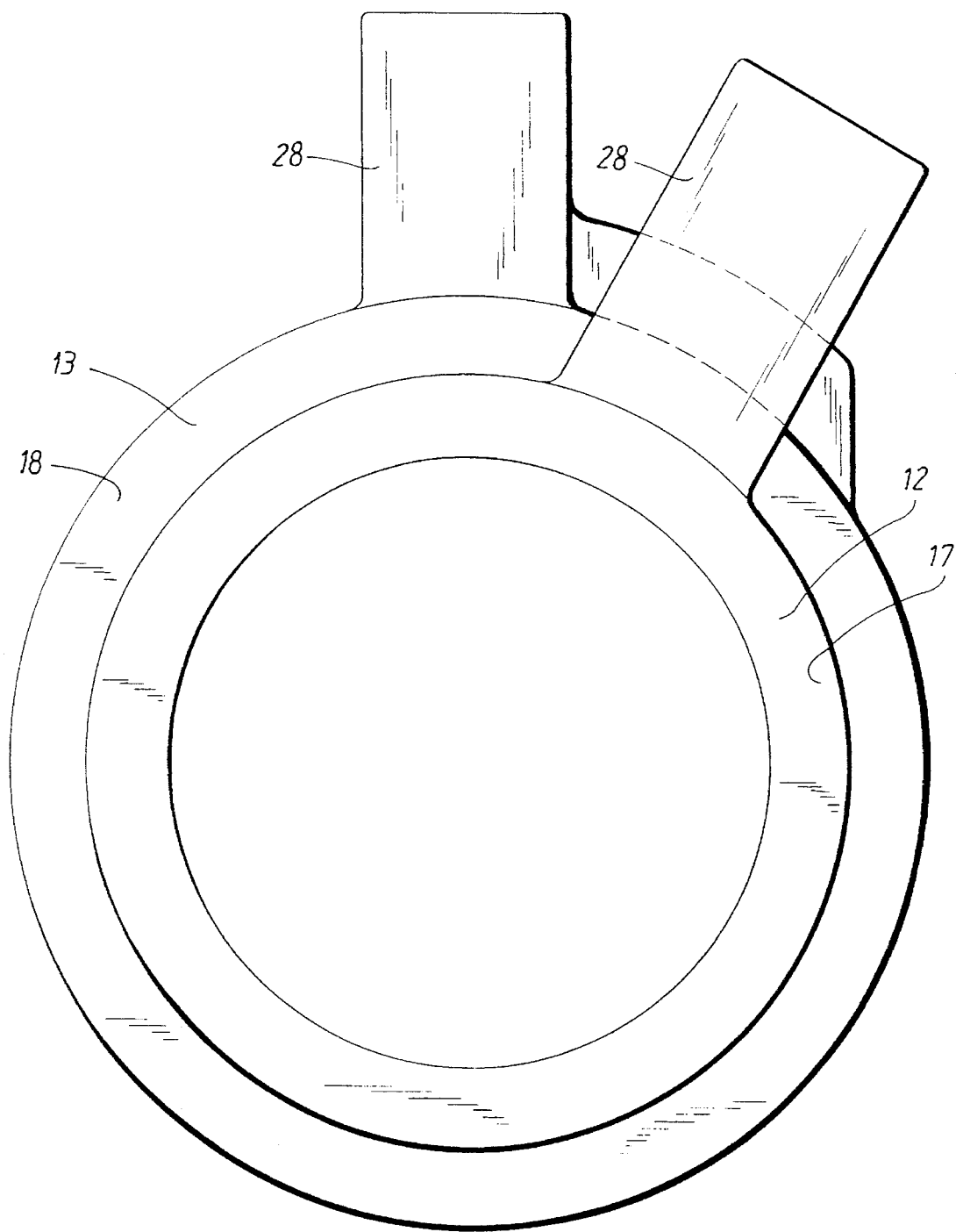
FIG. 11 is a top elevational view of a pair of ring members used in the swivel connection of the present invention.

FIG. 11 shows concentric rings 12 and 13, as well as 17 and 18, as seen from above. Each of these pairs has the same diameters, but the rings 17 and 18 are somewhat broader than the rings 12 and 13. The rings are in all other respects similar, except for the grooves for the O-rings 14 in the rings 12 and 13, which are shown on FIG. 3. The rings, which are electrically isolated from each other, are provided with coupling lugs 28 for electric leads.

Figure 12:
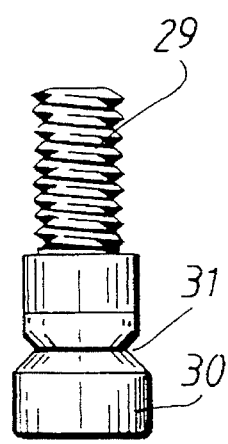
FIG. 12 is a side elevational view of fastening bolts for fastening the swivel connection of the present invention to a robot arm.

FIG. 12 shows a fastening bolt for mounting the swivel connection at the end of the robot arm. The bolt consists of a threaded part 29 which is intended to be screwed into the robot arm, and one upper cylindrical part 30, which is intended to be inserted into the bore 8 in the fastening ring 7. A groove 31 has been provided in the middle part, for receiving locking screws, which are provided in the side, through the bores 9 in the ring 7. This surrounding groove 31 has sides which form an angle of 45° with the axis of the bolt.

When the swivel connection is to be mounted on the robot arm, the fastening bolts are first screwed into the robot arm by means of the threaded part 29, and the swivel connection is placed on the cylindrical part 30, whereupon the locking screws are tightened against the groove 31. In this manner, one has thus located the groove 31 so that when the bolt is completely screws in and the swivel mounted, upon tightening the locking screws will be pressed against that side of the groove which faces away from the threaded part 29, whereby the fastening ring 7 will be pressed against the end surface of the robot arm.

In the figures, channels 11 are shown as being six in number. In this embodiment, two of the channels 11 are intended for the cooling water, while two other channels are intended for pressurized air, which is partly squeezing the rings together during welding for partly providing the welding jaw with pressurized air for the operation thereof. One of the further channels is intended for pressurized air, when the welding jaw is to be opened more forcefully, and the sixth hole is a spare hole. The particular channels which are to be used for each particular purpose is a matter of choice.

The swivel coupling has been described in connection with welding, but it is also apparent that it can also be used for other purposes, such as for controlling valves, gripping means, and other types of tools. The only difference between those swivel arrangements as compared with a welding process is the passage of a lower current amperage. It is also possible to completely shut off the current and use the swivel coupling for the supply of only air or liquid. For example, the fastening ring can be replaced by a plate, or the fastening piece can simply consist of the bottom of the hub itself.

Although the invention herein has been described with reference to particular embodiments, it is to be understood that the embodiments are merely illustrative of the principles and application of the present invention. It is therefore to be understood that numerous modifications may be made to the illustrative embodiments and that other arrangements may be devised without departing from the spirit and scope of the present invention as defined by the claims.

I claim:

1. A swivel connection for attachment to a robot arm for the supply of a fluid therethrough to associated tool means comprising a rotatable, cylindrical hub having a first transverse surface, a second transverse surface and an outer cylindrical surface, and attachment means on said first transverse surface for attachment to said robot arm, a non-rotatable coupling member having an inner surface surrounding said outer surface of said cylindrical hub, first and second concentric contact members juxtaposed with said coupling member and electrically isolated from each other and from said coupling member, a cover member on said second transverse surface of said cylindrical hub and rotatable therewith, first and second concentric ring members surrounding said cover member, said first concentric ring member juxtaposed with said first concentric contact member and said second concentric ring member juxtaposed with said second concentric contact member, said first and second concentric ring members being electrically isolated from each other and from said cover member, said coupling member including coupling member channel means extending therethrough including a first externally accessible end and a second end on said inner surface of said coupling member proximate to said outer cylindrical surface of said cylindrical hub, said cylindrical hub including hub channel means extending therethrough including a first end proximate to said second end of said coupling member channel means and a second end proximate to said cover member, said cover member including cover member channel means extending therethrough including a first end proximate to said second end of said hub channel means and a second end proximate to said first and second concentric ring members, and said first and second concentric ring members including ring member channel means extending therethrough, including a first end proximate to said second end of said cover member channel means and a second end for attachment to said tool means associated with said robot, whereby said fluid can be supplied from said first end of said coupling member channel means to said second end of said ring member channel means during rotation of said swivel connection.

2. The swivel connection of claim 1, wherein said fluid comprises a gas or liquid.

3. The swivel connection of claim 1, wherein each of said channel means comprises a plurality of channel members whereby a plurality of fluids may be supplied from said first ends of said plurality of coupling member channel means to said second ends of said plurality of ring member channel means during rotation of said swivel connection.

4. The swivel connection of claim 3, wherein said second ends of said plurality of coupling member channel means are axially displaced along said inner surface of said coupling member juxtaposed with said outer surface of said cylindrical hub, said outer surface of said cylindrical hub including a plurality of hub grooves at locations corresponding to said second ends of said plurality of coupling member channel means on said inner surface of said coupling member, each of said plurality of hub grooves communicating with said first end of said plurality of cylindrical hub channel members.

5. The swivel connection of claim 4, including a plurality of O-ring grooves alternating with said plurality of hub grooves on said outer surface of said cylindrical hub, and including a plurality of O-rings disposed in said plurality of O-ring grooves.

6. The swivel connection of claim 1, including insulation means electrically separating said first and second concentric contact members from each other and from said coupling member.

7. The swivel connection of 6, wherein said electrical insulation means comprises elastic O-ring members.

8. The swivel connection of claim 1, wherein said coupling member includes pressure channel means interposed between said coupling member channel means and a surface of said coupling member juxtaposed with said first and second concentric contact members whereby pressure may be supplied through said pressure channel means to urge said first and second concentric contact members against said corresponding first and second concentric ring members.

9. The swivel connection of claim 1, wherein said attachment means includes a plurality of longitudinally extending through bolt holes for affixing said attachment means to said cylindrical hub, and a corresponding plurality of fastening bolts extending through said through bolt holes.

10. The swivel connection of claim 9, wherein said attachment means includes threaded radial openings associated with said plurality of through bolt holes for applying locking screws to said fastening bolts contained in said through bolt holes.

11. The swivel connection of claim 10, wherein said a plurality of fastening bolts each includes a surrounding recess at a location corresponding to the location of said threaded radial openings.

12. The swivel connection of claim 11, wherein said surrounding recess includes sloping side walls having an angle of about 45' with respect to said fastening bolts.

* * * * *

UNITED STATES PATENT AND TRADEMARK OFFICE
CERTIFICATE OF CORRECTION

PATENT NO. : 5,488,215
DATED : January 30, 1996
INVENTOR(S) : Joachim Aronsson

It is certified that error appears in the above-indentified patent and that said Letters Patent is hereby corrected as shown below:

Column 8, line 65, "45'" should read --45°--.

Signed and Sealed this

Ninth Day of April, 1996

Attest:

BRUCE LEHMAN

Attesting Officer

Commissioner of Patents and Trademarks